United States Patent [19]
Bailey

[11] Patent Number: 5,696,641
[45] Date of Patent: Dec. 9, 1997

[54] METHOD USING A BIASING PATTERN ON A MAGNETIC STORAGE MEDIA TO REDUCE MR HEAD NOISE

[75] Inventor: Roger G. Bailey, Longmont, Colo.

[73] Assignee: Maxtor Corporation, Longmont, Colo.

[21] Appl. No.: 438,643

[22] Filed: May 10, 1995

[51] Int. Cl.[6] .................... G11B 5/03; G11B 5/86; G11B 5/09
[52] U.S. Cl. .................................. 360/66; 17/48
[58] Field of Search ............................ 360/46, 48, 66, 360/61, 62, 113, 17

[56] References Cited

U.S. PATENT DOCUMENTS

| | | | |
|---|---|---|---|
| 3,576,954 | 5/1971 | Sand | 360/66 |
| 4,809,092 | 2/1989 | Solhjell | 360/66 |
| 5,168,395 | 12/1992 | Klaassen et al. | 360/46 |
| 5,307,214 | 4/1994 | Kawakami et al. | 360/61 |
| 5,339,207 | 8/1994 | Moon et al. | 360/77.08 |
| 5,475,540 | 12/1995 | Gold | 360/48 |

*Primary Examiner*—Aristotelis M. Psitos
*Assistant Examiner*—Regina Y. Neal
*Attorney, Agent, or Firm*—Sheridan Ross P.C.

[57] ABSTRACT

The magnetic recording system of the present invention relaxes/reduces the magnetic energy in a magnetic recording head at the end of a write operation. In one embodiment, the magnetic recording system (10) includes a magnetic recording media (18), a recording head (14), and a biasing pattern (64) stored along a portion of the media (18). The biasing pattern (64) provides a biasing effect on the head (14) that provides controlled reduction of the magnetic energy domains in the head (14).

17 Claims, 2 Drawing Sheets

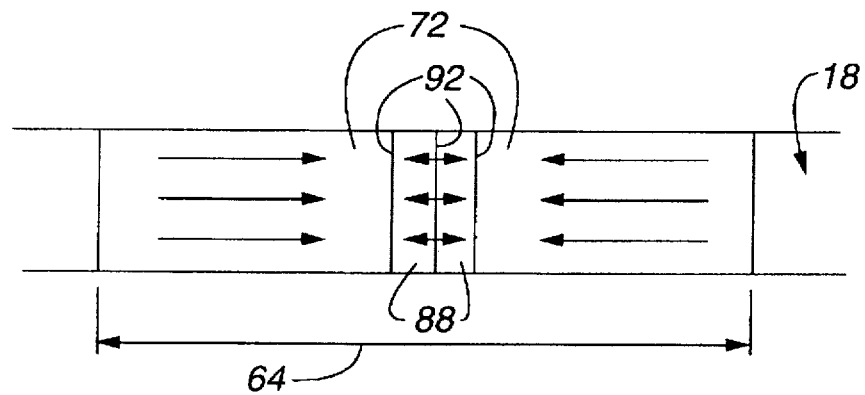
Fig. 2
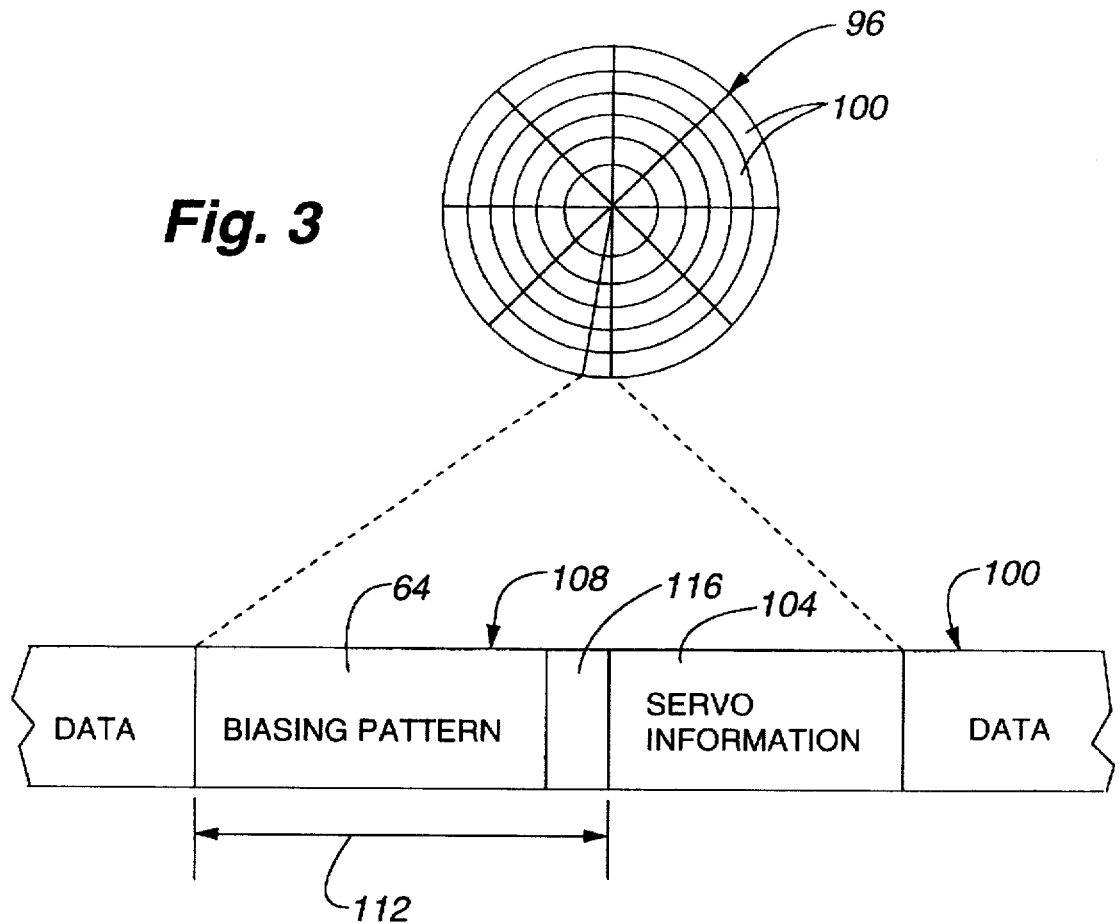
Fig. 3
Fig. 4

METHOD USING A BIASING PATTERN ON A MAGNETIC STORAGE MEDIA TO REDUCE MR HEAD NOISE

FIELD OF THE INVENTION

The present invention generally relates to the field of magnetic recording systems and, more particularly, to relaxation of magnetic energy in magnetic recording heads used in such systems.

BACKGROUND

The demands on magnetic storage systems have increasingly focused on such systems providing faster data access and improved reliability in accessing data and servo information. To provide faster data access, magnetic recording heads need to more rapidly perform writing and reading functions for data, as well as reading servo information. This in turn requires shorter transition times between the head writing data and then reading data or servo information. To provide improved reliability, magnetic recording heads need to more accurately read data and servo information stored on the recording media.

However, in known magnetic recording systems the magnetic recording head after a write cycle contains unstable magnetic domains that store energy. Relaxation of these magnetic energy domains creates abrupt transitions in the magnetization of the magnetic recording head which creates voltage spikes. These voltage spikes known as Barkhausen noise can erroneously be detected as a read pulse and/or corrupt data or servo information stored on the magnetic media. The effect of Barkhausen noise is particularly acute when reading servo information for accurately positioning the head along the magnetic recording media.

Barkhausen noise from magnetic energy domains can occur in a broad range of magnetic heads, including ferrite inductive heads, thin film inductive heads, and magnetoresistive heads. Moreover, while observable in dual element read/write magnetic heads, this noise is particularly troublesome in single element read/write magnetic heads.

Thus, the described unstable magnetic energy domain effects have detracted from the performance of magnetic heads and presented a limitation to a reduction of the transition time between write and read cycles and to an improvement in reliability in accessing and retaining data and servo information.

SUMMARY OF THE INVENTION

The present invention is directed to relaxation of magnetic energy domains remaining in recording heads at the end of a write operation. The invention reduces the magnetic energy domains in a recording head more rapidly than they would relax otherwise and thereby allows faster transition from a write cycle to a read cycle. The invention also relaxes the magnetic energy domains into a final state that produces less Barkhausen noise than otherwise and thereby causes fewer errors in reading data and/or servo information and less corruption of data and/or servo information on a magnetic recording media.

Magnetic recording media include magnetic tapes or magnetic disks with a single track or a plurality of tracks. The magnetic media is moved past the recording head as the recording head writes data or reads data and/or servo information along a track. For magnetic media having a plurality of tracks, the recording head is moved across the media to align the recording head with a selected track. The position of the recording head relative to each of the plurality of tracks is generally determined by the recording head periodically reading servo information stored in servo sectors in each track.

Recording heads include dual element heads having a separate read element and write element and single element heads having a combined read/write element. The recording head elements include ferrite inductive, thin film inductive, and magnetoresistive.

According to one aspect of the present invention, a magnetic recording system is provided that includes a magnetic media, a recording head for writing data onto the magnetic media, and a biasing pattern provided along a portion of the magnetic media. The biasing pattern is an inventive sequence of magnetic fields stored on the magnetic media that provide a biasing effect on the head that reduces/relaxes the magnetic energy domains in the recording head following a write operation and generally preceding a read operation.

In one embodiment, the biasing pattern includes a first portion having a uniform magnetic polarization in a substantially opposite direction to a second portion. Following a write operation, the recording head is positioned along the path of the biasing pattern on the moving media so that the recording head is magnetically biased in one direction by the first portion and then reverse biased in a substantially opposite direction by the second portion. Such magnetic biasing of the recording head provides controlled relaxation of the magnetic energy domains. In this manner, the head is relaxed and can thereafter be used in a read operation with substantially reduced Barkhausen noise.

Preferably, the first and second portions of the biasing pattern in the above-noted embodiment have lengths along the magnetic media at least as long as the recording head (e.g., combined length of the poles and the head gap) in the direction of motion of the magnetic media. In this manner, the entire recording head is biased in one direction by the uniformly polarized magnetic field of the first portion and then the entire recording head is similarly biased in the opposite direction by the second portion of the biasing pattern. For dual element recording heads having separate read and write elements, the first and second portions of the biasing pattern are at least as long as the write element.

In general, the recording head generates an electric pulse (i.e., bit) as it is moved between two magnetic fields having opposite magnetic polarizations. In this manner, the transition between the two biasing portions of the biasing pattern would generally generate a bit. However, under some circumstances the biasing pattern may not generate a bit, resulting in a false data gap. Such circumstances include Barkhausen noise masking the bit and/or eventually corrupting one of the biasing portions. In some magnetic storage systems, the length of the biasing pattern could generate a false data gap that is misinterpreted as a servo data gap that is normally provided to synchronize the servo.

Such misinterpretation of the biasing pattern is preferably overcome by the biasing pattern further including an odd-bit data field between the first and second portions for distinguishing the biasing pattern from servo information and/or data. The arrangement of the odd-bit data field within the biasing pattern generates an odd plurality of bits in the recording head. The odd-bit data field generally includes an even number of areas (i.e., at least two areas and thereafter an even number) with each area alternately having opposite magnetic polarity. The combination of the two biasing portions with the two or more areas of the odd-bit data field generates an odd plurality of bits as the head moves across each area of the biasing pattern. In this manner, the biasing pattern is immune to single bit dropouts and distinguishes the biasing pattern from servo information.

In the following embodiments of the present invention, the biasing pattern is positioned on the media so as to provide the above-noted relaxation of the magnetic energy domains before data or servo information are read. For magnetic media that include a plurality of tracks, one or more biasing patterns are generally provided along each of the plurality of tracks. In this manner, at the end of a write operation along a track, the recording head is biased by the biasing field in the track.

For an embedded servo system, servo information is provided along a portion of the magnetic media. Generally, the servo information is provided in one or more servo sector portions in each track on the magnetic media. The biasing pattern is preferably provided adjacent to or within the servo information so that the biasing pattern is sensed prior to the recording head reading the servo information. In this manner, the magnetic energy domains in the recording head are relaxed immediately before the servo information is read.

For some storage systems, the read channel circuitry becomes energized during a write operation due to electrical coupling of the read and write channel circuitry and electromagnetic interference effects. To increase the sensitivity of the read channel circuitry during a read operation, the read channel circuitry is generally allowed to partially settle following a write operation and before data or servo information is read. To allow such settling of the read channel circuitry before servo information is read, a portion of the magnetic media in front of the servo information is sometimes reserved as a read settle pad (i.e., a portion of the media that is generally not used to store data or servo information).

Preferably, the recording head is relaxed while the read channel circuitry is settling by providing the biasing pattern within the read settle pad. In this manner, the biasing pattern does not result in loss of storage capacity and the combined head relaxation and read channel settling step avoids any time delay that would be associated with a separate step for relaxing the recording head.

According to another set of embodiments of the present invention, the above-noted magnetic recording system further includes a biasing electric circuit that writes the biasing pattern along the magnetic media. In another embodiment, the biasing electric circuit is further operative for formatting the magnetic media with servo information and magnetic biasing fields along portions of the magnetic media. For a disk type magnetic recording media, the biasing electric circuit forms a plurality of concentric tracks on the disk with the servo information and writes the biasing field along a portion of at least one track. Generally, the biasing pattern is written within each servo sector so that the recording head is relaxed prior to reading servo information in each servo sector.

In another aspect, the present invention is a method for reducing magnetic energy domains in a magnetic recording head reading and writing data on a magnetic recording media. The methodology includes writing a biasing pattern on the media by providing a two polarity electrical signal to the head. The two polarity electrical signal writes a two polarity biasing pattern on the media. In one embodiment, each polarity of the two polarity signal is applied to the head for a period of time that is sufficient to write a corresponding polarity biasing pattern along a portion of the media that is at least as long as the length of the head.

BRIEF DESCRIPTION OF THE DRAWINGS

For a more complete understanding of the present invention and further advantages thereof, reference is now made to the following Detailed Description, taken in conjunction with the Drawings, in which:

FIG. 2 is an explanatory diagram illustrating a biasing pattern having a tribit data field stored along a portion of the media;

FIG. 3 illustrates a magnetic disk having concentric tracks and a servo sector; and FIG. 4 illustrates the positioning of the biasing pattern along a track within the servo sector of FIG. 3.

DETAILED DESCRIPTION OF THE INVENTION

Figure 1:
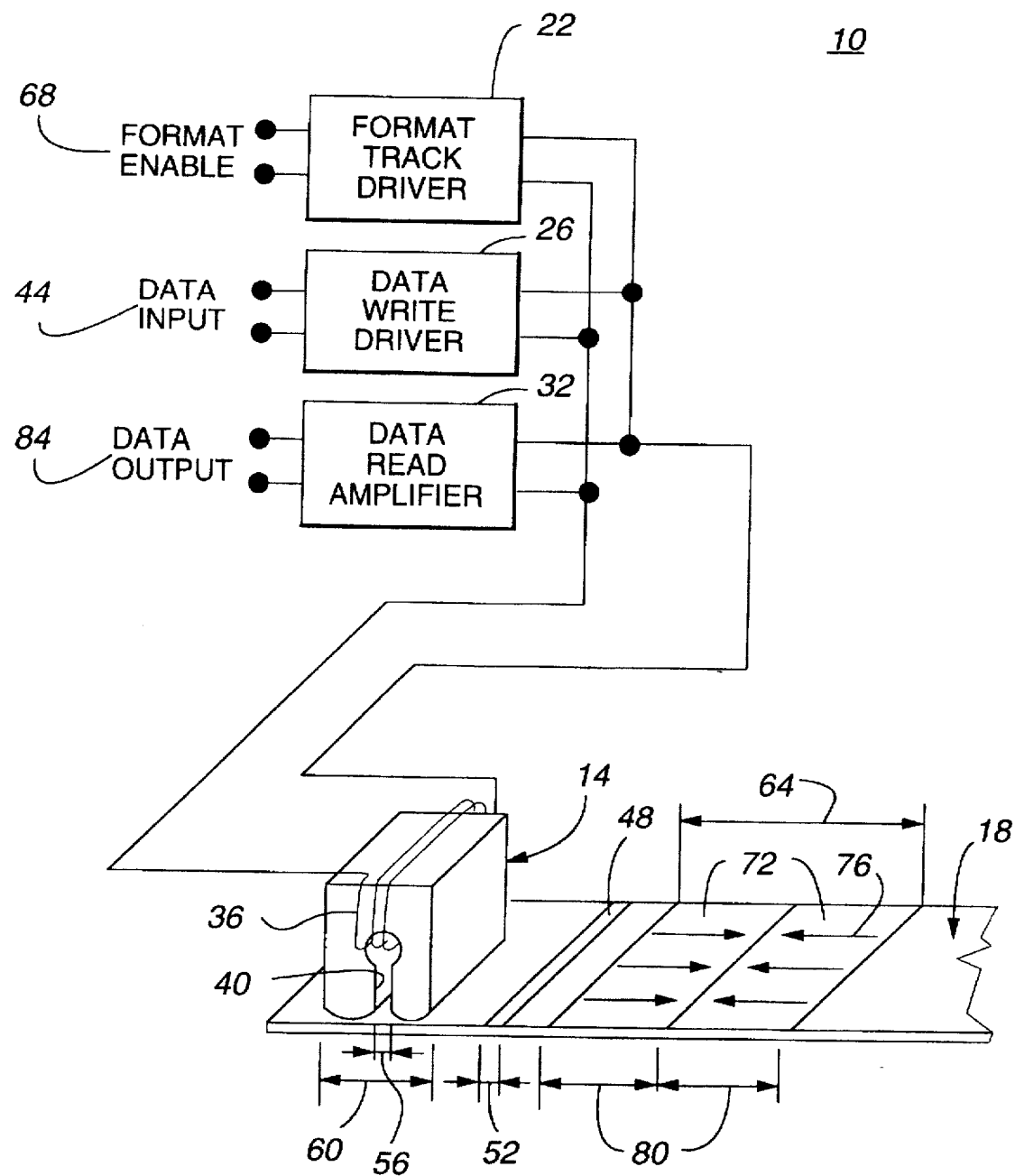
FIG. 1 is a block diagram of a magnetic recording system according to the present invention.

Referring to FIG. 1, a block diagram of a magnetic recording system 10 according to the present invention is shown. The magnetic recording system 10 generally includes a head 14, a magnetic media 18, a format track driver 22, a data write driver 26, and a read data amplifier 32.

The media 18 is moved past the head 14 as the head 14 writes and reads data and/or servo information on the media 18. The illustrated head 14 is an inductive read/write head having an inductive coil 36 and a head gap 40.

When the system 10 is performing a write operation, data input 44 into the system 10 is written onto the media 18 by the data write driver 26 driving the coil 36 to create a series of uniformly polarized magnetic fields across the head gap 40. These fields write a corresponding series of uniformly polarized data fields 48 on the media 18. The length of each of data fields 48 is minimized to increase the storage capacity of the media 18. Each of the data fields 48 generally has a length 52 from about one to three times the width 56 of the head gap 40 and substantially shorter than the length 60 of the head 14. At the end of write operation, the head 14 contains unstable magnetic energy domains.

As is well known in the art, for data encoding formats such as various Run Length Limited codes (RLL), a logic "1" bit is encoded by reversing the polarization of the written magnetic field. RLL encoding limits the maximum length that a written data pattern can have a series of similarly polarized magnetic fields (i.e., a series of "0" bits). This limitation is required due to the need to generate high frequency clock pulses from the polarization reversals during a read operation and to distinguish the data pattern from a servo data gap. In this manner, the maximum length of a series of uniformly polarized data fields is limited to substantially less then the length 60 of the head 14.

According to the present invention, the system 10 further includes an inventive biasing pattern 64 stored on the media 18 that is used to reduce/relax the magnetic energy domains in the head 14 following a write operation. The format track driver 22 writes the inventive biasing pattern 64 responsive to a format enable command 68. Generally, the biasing pattern 64 is written while the media 18 is being formatted with servo information. However, the biasing pattern 64 can be written at other times after the media 18 is formatted.

The biasing pattern 64 generally includes two biasing areas 72 having opposite magnetic polarizations, as illustrated by the arrows 76. The biasing pattern 64 provides a magnetic biasing effect on the head 14 that relaxes/reduces the magnetic energy domains in the head 14. Each of the biasing areas 72 have lengths 80 at least as long as the length 60 of the head 14. To write the biasing areas 72, the format track driver 22 sequentially applies two opposite polarity signals to the head 14. Each polarity of the signal is maintained for a period of time that is sufficient to write two corresponding oppositely polarized biasing areas 72 having appropriate lengths 80.

Following a write operation, the head 14 is positioned along the path of the biasing pattern 64 so that the entire head 14 is magnetically biased in one direction by one of the biasing areas 72 and then the entire head 14 is reverse biased in a substantially opposite direction by the other biasing area 72. Such magnetic biasing of the head 14 provides controlled relaxation of the magnetic energy domains.

When the system 10 is performing a read operation, transitions between the magnetic polarities of the fields stored on the media 18 induce a current in the head 14 that is amplified by the data read amplifier 32. In general, the data read amplifier 32 outputs 84 a bit as the head 14 is moved between two magnetic fields having opposite magnetic polarizations. In this manner, the transition between the two biasing areas 72 of the biasing pattern 64 would generally generate a bit. However, Barkhausen noise can mask this transition so that a bit is not generated, resulting in a measured data gap corresponding to the length 60 of the biasing pattern 64. In some magnetic storage systems, a measured data gap of this length could be misinterpreted as a servo data gap that is normally provided to synchronize the servo.

To prevent such misinterpretation, the biasing pattern preferably includes an odd-bit data field between the two biasing areas. The odd-bit data field includes an even number of areas with each area having alternately oppositely polarized magnetic fields. The combination of the two biasing areas with the odd-bit data field generates an odd plurality of bits as the head moves across each area of the biasing pattern. In this manner, the biasing pattern is immune to single bit dropouts and distinguishes the biasing pattern from servo information.

Referring now to FIG. 2, a biasing pattern 64 is shown that includes a tribit data pattern 88 (i.e., an odd-bit data field) positioned between the two biasing areas 72. The arrangement of the tribit data pattern 88 and the two biasing areas 72 generates three bits 92 as the head moves through the biasing pattern 64. In this manner, the biasing pattern 64 accommodates the head 14 missing a bit by providing subsequent bits that distinguish the biasing pattern from servo information or data.

Referring now to FIGS. 3 and 4, the media 18 (FIG. 1) is a magnetic disk 96 having a plurality of concentric tracks 100. During a servo pattern writing operation, the format track driver 22 (FIG. 1) writes a biasing pattern 64 and servo information 104 along a servo sector 108 on the disk 96.

During a write operation, the data read amplifier 32 (FIG. 1) becomes energized due to electrical coupling between the data write driver 26 and the data read amplifier 32. To allow the data read amplifier 32 to partially settle before the servo information 104 is read, each track in the servo sector 108 includes a read settle pad 112 adjacent to the servo information 104. In this manner, following a write operation, the circuitry of the data read amplifier 32 can partially settle before the head reads the servo information 104.

The biasing pattern 64 is preferably written within each read settle pad 112 with any remaining portion 116 of the read settle pad 112 following the biasing pattern 64. In this manner, the biasing pattern 64 reduces the magnetic energy domains in the head 14 (FIG. 1) before the servo information 104 is read. By positioning the biasing pattern 64 in the read settle pad 112, the biasing pattern 64 occupies disk area that would otherwise not be used. In this manner, the storage capacity of the disk is not reduced.

While various embodiments of the present invention have been described in detail, it is apparent that further modifications and adaptations of the invention will occur to those skilled in the art. However, it is to be expressly understood that such modifications and adaptations are within the scope of the present invention.

What is claimed is:

1. A method for using a biasing pattern in a magnetic head reading and writing data on a magnetic storage media, comprising the steps of:

providing a biasing pattern along a portion of said magnetic storage media, said providing step including:

providing a first polarity electrical signal to said magnetic head; and providing a second polarity electrical signal having an electrical polarity opposite to said first polarity electrical signal to said magnetic head;

writing a first data pattern along a portion of said magnetic storage media, said magnetic head having a plurality of magnetic energy domains after writing said first data pattern; and using said biasing pattern to bias said magnetic head.

2. A method, as claimed in claim 1, wherein said step of using said biasing pattern includes:

moving said magnetic head over a first portion of said biasing pattern having a magnetic polarization in a first direction and moving said magnetic head over a second portion of said biasing pattern having a magnetic polarization in a substantially opposite direction to said first portion.

3. A method, as claimed in claim 1, wherein said step of using said biasing pattern includes:

moving said magnetic head over a first portion of said biasing pattern having a magnetic polarization in a first direction and said first portion having a length at least as long as said magnetic head; and moving said magnetic head over a second portion of said biasing pattern having a magnetic polarization in a substantially opposite direction to said first portion and said second portion having a length at least as long as said magnetic head.

4. A method, as claimed in claim 1, wherein said step of using said biasing pattern includes:

moving said magnetic head over a first portion of said biasing pattern having a magnetic polarization in a first direction and said first portion having a length longer than said first data pattern; and moving said magnetic head over a second portion of said biasing pattern having a magnetic polarization in a substantially opposite direction to said first portion and said second portion having a length longer than said first data pattern.

5. A method, as claimed in claim 1, wherein:

said first data pattern is shorter than a length of said magnetic head.

6. A method, as claimed in claim 1, wherein said step of using said biasing pattern includes:

moving said magnetic head over a first portion of said biasing pattern having a magnetic polarization in a first direction;

writing a second data pattern along a portion of said magnetic storage media after moving said magnetic head over said first portion; and moving said magnetic head over a second portion of said biasing pattern having a magnetic polarization in a substantially opposite direction to said first portion after writing said second data pattern.

7. A method, as claimed in claim 1, wherein said step of using said biasing pattern includes:

moving said magnetic head over a first portion of said biasing pattern having a magnetic polarization in a first direction;

reading a second data pattern along a portion of said magnetic storage media after moving said magnetic head over said first portion; and moving said magnetic head over a second portion of said biasing pattern having a magnetic polarization in a substantially opposite direction to said first portion after reading said second data pattern.

8. A method, as claimed in claim 1, wherein said step of using said biasing pattern includes:

moving said magnetic head over a first portion of said biasing pattern having a magnetic polarization in a first direction;

moving said magnetic head over an odd-bit data of said biasing pattern; and moving said magnetic head over a second portion of said biasing pattern having a magnetic polarization in a substantially opposite direction to said first portion.

9. A method, as claimed in claim 1, wherein said step of using said biasing pattern includes:

moving said magnetic head over a first portion of said biasing pattern having a magnetic polarization in a first direction;

moving said magnetic head over a tri-bit pattern of said biasing pattern; and moving said magnetic head over a second portion of said biasing pattern having a magnetic polarization in a substantially opposite direction to said first portion.

10. A method, as claimed in claim 1, wherein said step of using said biasing pattern includes:

moving said magnetic head over a read settling portion of said biasing pattern;

moving said magnetic head over a first portion of said biasing pattern having a magnetic polarization in a first direction; and moving said magnetic head over a second portion of said biasing pattern having a magnetic polarization in a substantially opposite direction to said first portion.

11. A method, as claimed in claim 1, wherein said step of using said biasing pattern includes:

reading a second data pattern on said magnetic storage media after moving said magnetic head over said first polarized magnetic field.

12. A method for using a biasing pattern in a magnetic head reading and writing data on a magnetic storage media, comprising the steps of:

providing a biasing pattern along a portion of said magnetic storage media, said providing step including:

providing a first polarity electrical signal to said magnetic head for a predetermined period of time sufficient to write a uniformly polarized magnetic field along said magnetic storage media for a length at least as long as said magnetic head; and providing a second polarity electrical signal having an electrical polarity opposite to said first electrical signal to said magnetic head for a predetermined period of time sufficient to write a uniformly oppositely polarized magnetic field along said magnetic storage media for a length at least as long as said magnetic head;

writing a first data pattern along a portion of said magnetic storage media, said magnetic head having a plurality of magnetic energy domains after writing said first data pattern; and using said biasing pattern to bias said magnetic head.

13. A method, as claimed in claim 12, wherein said step of using said biasing pattern includes:

moving said magnetic head over said first polarized magnetic field, with a length of said first polarized magnetic field being longer than said first data pattern; and moving said magnetic head over said second oppositely polarized magnetic field, with said second oppositely polarized magnetic field having a length longer than said first data pattern.

14. A method, as claimed in claim 12, wherein:

said first data pattern is shorter than a length of said magnetic head.

15. A method, as claimed in claim 12, wherein said step of using said biasing pattern includes:

writing a second data pattern onto the magnetic storage media after moving said magnetic head over said first polarized magnetic field.

16. A method, as claimed in claim 12, wherein said step of using said biasing pattern includes:

moving said magnetic head over an odd-bit data of said biasing pattern.

17. A method, as claimed in claim 12, wherein said step of using said biasing pattern includes:

moving said magnetic head over a tri-bit pattern of said biasing pattern.

* * * * *